Dec. 14, 1965
J. L. HARRIS
3,223,880
APPARATUS AND METHOD FOR DETECTION OF TARGETS AT HIGH LIGHT LEVELS
Filed Jan. 30, 1961
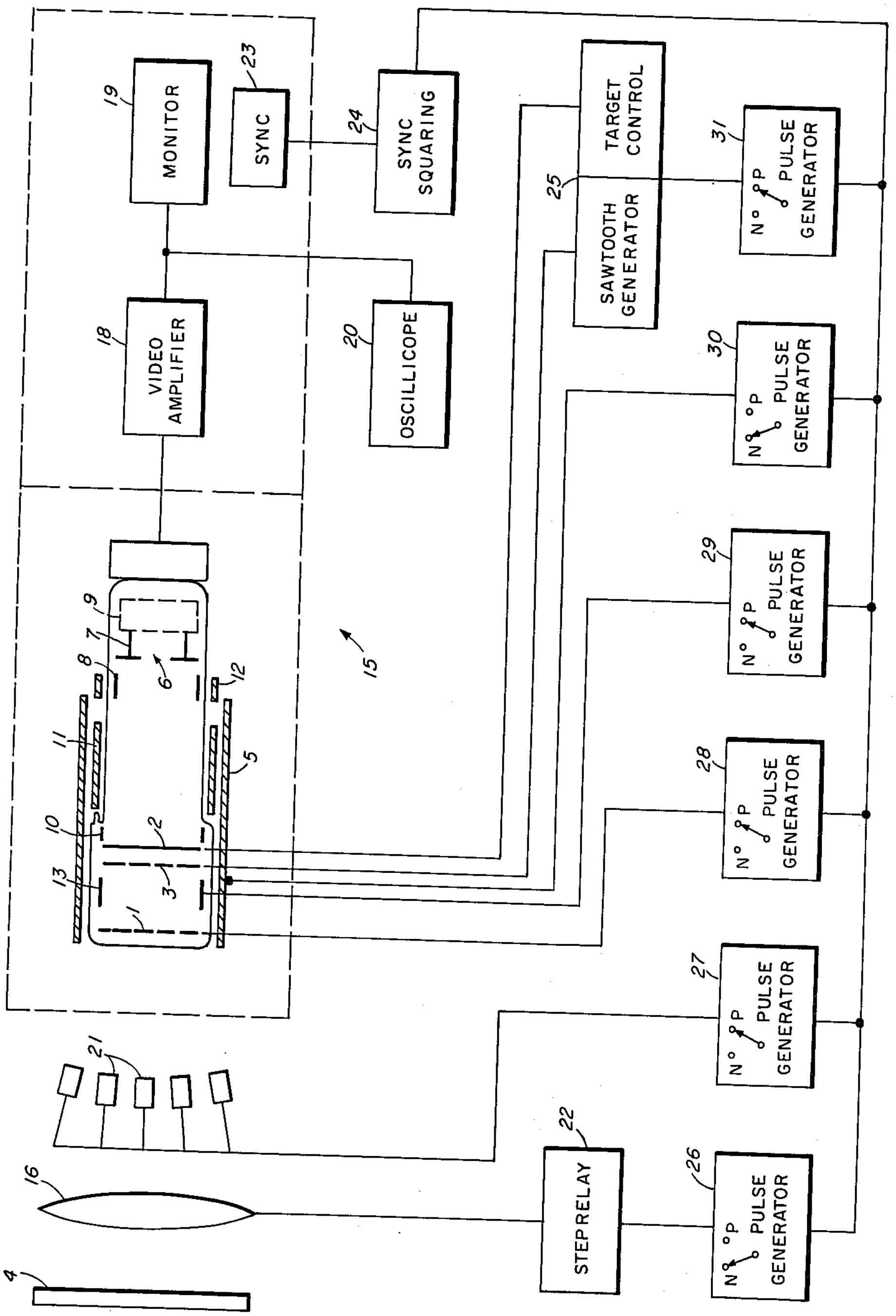
INVENTOR.
JAMES L. HARRIS
BY
ATTORNEYS United States Patent Office 3,223,880

Patented Dec. 14, 1965

3,223,880

APPARATUS AND METHOD FOR DETECTION OF TARGETS AT HIGH LIGHT LEVELS

James L. Harris, San Diego, Calif., assignor, by mesne assignments, to the United States of America as represented by the Secretary of the Navy Filed Jan. 30, 1961, Ser. No. 85,939
2 Claims. (Cl. 315—12)

This invention relates to storage tubes and, more particularly, to a means and a method for increasing the flux utilization of a storage tube at high light levels, and more specifically, to a means and method for circumventing the saturation effect in an image orthicon at high light levels.

Prior, heretofor, considerable effort has been devoted to the analysis of the fundamental performance capabilities of various types of photoelectric sensor systems. Performance comparisons have been made between multiplier phototube arrays, image orthicon television systems, and vidicon television systems for several specific detection functions. In every instance it was indicated that at low light levels the image orthicon was clearly the superior detector but that at high light levels the image orthicon was limited in flux utilization by a saturation effect. This can be explained by reference to a photoelectric system wherein the sensitivity of the photoelectric system is the product of the area of the collecting lens and the number of independent photo-sensitive elements. For example, a one inch diameter lens coupled with one multiplier photo tube would have a product $$\frac{\pi}{4}(1^2)(1)=\frac{\pi}{4}$$

square inches. Contrasted with this, an image orthicon, because of its inherent storage characteristics may be considered to have as many independent photosensitive elements as it has resolution units. A typical image orthicon has something on the order of 500 lines resolution horizontally and vertically for a total of 250,000 resolution units, therefore, the product for the image orthicon with a one inch lens is approximately $\pi/4$ (250,000) square inches.

However, as noted previously, this tremendous potential of the image orthicon cannot be utilized at high light levels because of the saturation effect which produces an unfavorable signal-to-noise ratio when viewing a target of fixed contrast at the high light levels. In order to prevent such saturation at higher light levels it has been customary to reduce the effective area of the objective lens, thereby reducing the amount of incident light on the photocathode element of the image orthicon. This may be accomplished, for example, by using neutral density filters to cut down the light incident on the photocathode element.

In the storage tube there are two primary noise sources inherent; one consisting of the noise in the charge pattern on the target which results from the photon shot noise in the charge pattern on the target which results from the photon shot noise in the electron image emitted from the photocathode; the second, the noise source corresponding to the shot noise associated with the scanning beam, when viewing a target of fixed contrast.

Under normal operating conditions, when viewing an object having a fixed value of target contrast and a fixed value of lens area, the signal-to-noise ratio increases as the square root of increasing background luminance. However, when saturation luminance is attained, further increases in background luminance must be compensated for by a decrease in lens area in such a way that the product of background luminance and lens area is maintained constant. At this point the signal-to-noise ratio becomes independent of background luminance, i.e., background luminance is decreased by the use of neutral density filters which also effectively decreases the signal while the noise level due to the scanning beam and charge pattern on the target element does not decrease.

Therefore, an object of the present invention is to provide a method and means of preventing saturation in a storage tube.

Another object of the present invention is to provide a means for maintaining the signal-to-noise ratio dependent upon background luminance.

A further object of the invention is to provide a means and method of rendering the effect of background luminance at a minimum.

Another object of the present invention is to provide a storage tube which may be utilized at high light levels.

A further object of the invention is to provide a storage tube which has the capability for detection purposes under high light level conditions.

Another object of the invention is to provide a storage tube capable of detection of low contrast objects at high light levels.

A further object of the present invention is to provide a storage tube which has improved discrimination properties.

A further object of the present invention is to provide means for improving the detection properties of an image orthicon tube.

Other objects and advantages will become apparent after reading the following detailed description of the invention.

The objects and purposes of the instant invention are attained through the use of a storage tube wherein electrons are periodically restored to the target element thereby obviating the saturation effect in the storage tube.

The invention is illustrated and described in conjunction with the accompanying drawing wherein like numerals indicate like elements.

In order that the present invention may be more clearly defined it is believed desirable to set forth a brief discussion of the preexisting normal operation of prior detection devices utilizing a storage tube and, more specifically, those utilizing an image orthicon storage tube. Referring to the drawing in the image section of the storage tube, there is shown a cathode element 1 which in the instant case is constructed of a photo-emissive material operated at a very negative potential, for example, −300 to −400 volts, a target 2 of thin glass of low resistivity approximately 3 microns thick, operated at about 0 to −10 volts, and a screen having about 1,000 meshes per inch and located only a few thousandths of an inch from the target screen 3. The screen is normally operated a few volts positive with respect to the target element 2. The photosensitive film or cathode 1 is so thin that when an optical image as at 4 is focused on its left-hand side, primary electrons are emitted from the right-hand side in proportion to the light intensity of the image. The electrons emitted by the photocathode are attracted toward the screen but most of them pass through the meshes and strike the target 2. A focusing coil 5 causes all of the electrons originating from a given point on the photosensitive surface to focus at a corresponding point on the target by producing magnetic-flux lines parallel to the axis of the tube, thereby controlling the path of travel of the electrons emitted by the photocathode 1. As the primary electrons emitted by the photocathode strike the target they produce secondary electrons that are drawn to the screen, leaving positive charges on the target having an intensity distribution that corresponds to the light distribution of the optical image projected on the cathode.

The back of the target 2 is then scanned in accordance with the standard scanning sequence by an electron beam produced by an electron gun 6 that is at ground potential. This electron beam deposits just enough electrons at each point on the back of the target to neutralize the positive charge on the image side whereupon the remaining electrons in the scanning beam are then returned toward the electron gun 6. The target plate is made of glass having a conductance such that the electrons deposited on the target by the scanning beam will leak through the target plate and neutralize the positive charge on the opposite side in the time that elapses between successive scans of the electron beam. Accordingly, as the electron beam scans the target, it deposits electrons in proportion to the light intensity during the previous time of the successive portion of the optical image. The current in the returning electron beam, therefore, varies in amplitude in accordance with variations of the light intensity of the successive portion of the optical image being scanned.

Most of the electrons in return beam strike the aperture of the electron gun 6, the surface of which is treated to be a good emitter of secondary electrons. An element designed in this way to serve as an emitter of secondary electrons is often called a dynode, meaning dynatron electrode and the term may be used interchangeably. The secondary electrons thus produced are deflected into an electron-multiplier system 9 consisting of a succession of surfaces 7 at progressively higher positive potential, treated to give relatively high secondary-electron emission, and so arranged that the secondary electrons produced at one surface are focused upon the next. In this way the secondary electron produced by the returning beam when striking surface 7, will produce still more secondary electrons upon striking the next surface and so one. Since the number of secondary electrons is always exactly proportional to the incident electrons, the output of the electron-multiplier is an accurate reproduction of the current in the returning beam.

Grid 8 serves to control the motion of the secondary electrons produced by the returning beam in such a manner as to guide them into the electron-multiplier indicated at 9 while grid 10, adjacent to the target, decelerates the electrons comprising the scanning beam so that it strikes the target at a low velocity, yet still remains in proper focus at all times during the scanning operation. The electron beam is caused to scan the target by means of two sets of deflecting coils 11 arranged to produce horizontal and vertical transverse magnetic fields. An alignment coil 12 produces a magnetic field that aligns the scanning beam as it leaves the electron gun.

In the image section of the storage tube, the electrons emitted by the cathode are focused on the target by the combined action of the electrostatic field set up by a ring-like accelerator grid 13 and the axial magnetic field of the focusing coil 5. By proper adjustment of the voltage between cathode and target in relationship to the strength of the magnetic field and the potential on grid 13, it is possible to focus at a single spot on the target all of the electrons originating at a given spot on the cathode.

As stated previously, the target emits secondary electrons upon primary electrons emitted by the photocathode impinging thereon which are attracted to the screen which is held at a potential slightly positive with respect to the target. Since the secondary emission ratio is greater than unity, i.e., more electrons leave the target than arrive at the target, the target becomes positively charged in a pattern which corresponds to the optical image of the scene being scanned by the objective lens. Due to consideration of electron optics, an upper limit to the positive potential on the screen with respect to the target is dictated. When the target has emitted enough electrons to reach the same potential as the screen element, the secondary electrons are no longer attracted toward the screen but rather fall back upon the target as an aberrant image. This results in a saturation condition. Therefore, the point of saturation sets an upper limit on the flux which can be allowed incident on the photocathode element and in order to prevent saturation at higher light levels it is necessary to reduce the effective area of the objective lens, for example, by introducing neutral density filters in front of the objective lens, thereby reducing the photocathode illumination. For a target of fixed contrast with respect to a background, this means that the signal-to-noise ratio is independent of light level for high light level operation.

Noise is inherent in the storage tube and arises from two primary sources. The first source is the noise in the charge pattern on the target which results from the photon shot noise in the electron image emitted from the photocathode while the second noise source is the shot noise associated with the scanning beam. Under normal light level conditions the image orthicon is limited by the combination of the photon shot noise variation in the charge on the target and the shot noise of the scanning beam, that is to say, when no saturation occurs. Because of the shot noise associated with the scanning beam it is desirable that the beam current be minimum and ideally, the beam current would be just sufficient to neutralize the peak charge existing on the target element. However, several factors make it necessary to maintain a beam current which is larger than that current just required to neutralize the charge on the target. Primarily, this is caused by the fact that the electrons in the scanning beam have different energy levels and the potential which returns the electrons to the dynode multipliers acts on the lower energy electrons before they strike the target. Therefore, this means that only the higher energy electrons will be effective in discharging the target when the positive charge on the target is at a low level.

The signal-to-noise ratio can be expressed as an equation, the derivation of which is not shown due to length $$\frac{S}{n}=C\omega\sqrt{\frac{BA_LSTM}{2\epsilon\Omega}}\sqrt{\frac{K_1(\sigma-1)^2}{\frac{\sigma^2-\sigma+1}{2}+(\sigma-1)(K_2-1)}}$$

where C is the apparent contrast of the target, B is the background luminance, $A_L$ is the area of the lens pupil, S is the photocathode sensitivity, T is the frame period, M is the number of independent resolution elements, $\epsilon$ is the electron charge, $\Omega$ is the solid angle of the field of view, $K_1$ is the electron transmission of the screen grid, $K_2$ is the ratio of actual beam current to that required to theoretically neutralize the charge on the target, and $\sigma$ is the secondary emission ratio of the target surface. Attention is drawn to the fact that for a fixed value of target contrast and a fixed value of lens area, the signal-to-noise ratio increases as the square root of increasing background luminance.

When saturation condition is reached, i.e., saturation luminance is attained, then further increases in background luminance must be compensated for by a decrease in $A_L$ in such a way that the product $BA_L$ is maintained constant. At this point, the signal-to-noise ratio becomes independent of B. By way of illustration, let us assume that it is desired to detect small images when viewed against a 1000 ft. lambert horizon sky. If a storage tube, for example, an RCA 5820 image orthicon were used with a *f*/1.5 lens, the tube would saturate at a scene luminance of approximately 0.09 ft. lamberts. However, the background horizon sky, as previously stated, has a value on the order of 1000 foot lamberts, therefore, saturation would occur long before the 1000 foot lambert level. If an image orthicon existed having no saturation effect this would result in a theoretical improvement in signal-to-noise ratio of a factor of approximately 100 when televising small targets viewed against a 1000 foot lambert horizon sky.

From the foregoing, it is apparent that the capability of the image orthicon would be improved if it were possible to limit the saturation effect, thereby maintaining the signal-to-noise ratio dependent upon background luminance.

The apparatus and method whereby the effect of background luminance is controlled constitutes the present invention and involves the control of the magnitude of the secondary emission ratio at the target surface. The secondary emission ratio is a function of the velocity of the primary electrons upon the target element and can be controlled by means of varying the effective voltage differential existing between the cathode element and the target element in the storage tube. If this voltage differential is decreased sufficiently the secondary emission ratio will fall below unity, i.e., more electrons will land on the target than will be emitted. This type of operation would result in the target growing more negative with respect to time as compared with normal image orthicon operation wherein the target grows more positive with respect to time.

To more clearly explain the suggested operation, assume that an image orthicon is viewing a uniform background of high luminance, such as the sky, wherein it is desired that an object image be detected. At the start of a frame period the target element of the tube will immediately begin to rise toward screen potential, i.e., electrons will be released from the target element due to secondary emission thereby decreasing the negative potential of the target. Suppose that before the target reaches the saturation point the potential of the screen is changed to a value equal to or less than target potential. At this time the secondary electrons emitted by the target would be returned to the target and the potential of the target would then become increasingly less positive, i.e., electrons are returning to the target and restoring the negative charge on the target. The screen could be left at this potential until the target reaches zero potential then the screen would be returned to its normal operating potential and the target would once again begin to acquire a positive charge. This switching of screen potential from positive with respect with the target to negative with respect to the target could occur through a proper choice of duty cycle and amplitude of the screen switching pulses so that the storage tube or image orthicon could operate with full lens area without saturation.

However, in the example chosen, such a switching operation would not only eliminate saturation in the image orthicon but would also eliminate any object images as well if it were not for the aberrant quality of the secondary emission image. Now, if the object image to be detected is very small, i.e., approaching a point source, during the normal operation of the image orthicon the flux from this point source will result in a potential increase at a point on the target element with respect to the high background luminance. This would be equivalent to a white-dot-on-white situation. When the potential of the screen is switched to a negative condition with respect to the target element the secondary electrons emitted from this point source will be spread over a larger area upon their return to the target, and therefore, the potential of this point will not be returned to zero, i.e., the background area will be reduced with respect to the point source. For uniform background or extended images, target element potential will return toward zero at the end of a frame. Thus, such a system can be operated in such a manner as to discriminate against large images in favor of small images in addition to preventing saturation.

However, the system can also be operated in such a manner that relatively large images are retained. This is accomplished by supplying an auxiliary light source for flooding the cathode element with light while maintaining the electron image and optical image in focus.

The drawing is a block diagram of the apparatus for accomplishing the detection of small object images against a high background luminance or the white-dot-on-white situation. The outer-lines enclose an unmodified General Electric PE 16–A portable camera chain wherein an RCA 5820 image orthicon tube, discussed previously, is incorporated and is shown to the left of the square marked video amplifier. The output of the dynode multiplier 9 is introduced into a video amplifier 18 and the output of the video amplifier is introduced into a monitor 19 and an oscilloscope 20. An array of glow modulator tubes 21 is arranged around the input end to the image orthicon and surrounds the cathode 1 in such a way as to illuminate the cathode without interfering with the screen flux path from an objective lens 16 to the cathode. A stepping relay or other mechanical means 22 is provided for focusing and defocusing the objective lens 16. In the body of the camera 15 there is incorporated a synchronous generator 23 associated with the horizontal and vertical deflectors of the scanning beam in the camera. The output of the synchronous generator associated with the horizontal scan is introduced into a wave squaring device 24 wherein the exponential wave pattern from the output of the synchronous generator 23 is modified to produce a nearly instantaneous pulse. Associated with target 2 and screen 3 is a target control-sawtooth generator 25 which consists of a means for adjusting the voltage on the target and also provides a sawtooth wave form on the screen 3 which may vary from a plus 10 volts to a minus 10 volts. In normal operation of the tube in unmodified form the target control would be on the control panel of the camera, however in the modification the target control is combined with the sawtooth generator for convenience. Once the target voltage is adjusted to the desired level, however, it is left at that level and never pulsed in the operation comprising the instant invention. Associated with the objective lens 16, glow modulator tube 21, photocathode 1, accelerator 13, focusing coil 5, sawtooth generator and target control 25 are a series of pulse generators 26, 27, 28, 29, 30 and 31. The individual pulse generators are indicated as having two positions of operation, i.e., pulse or normal operation. In the pulse position an output voltage is produced at varying intervals or of a varying magnitude while in the normal position no voltage or a constant voltage is produced, i.e., the pulse generator 26 associated with the stepping relay 22 or means for defocusing the objective lens 16 is either in a focus or defocus condition that is to say, voltage is applied or not applied to the relay from the pulse generator 26. The same holds for the pulse generator 27 associated with the glow modulator tubes 21. Either the tubes are on, i.e., pulse, or off in normal position. The pulse generator 28 associated with the photocathode 1 causes the voltage potential on the photocathode to fluctuate, in pulse position, between a value of −400 to +10 volts whereas in normal operating position the voltage on the photocathode would be approximately −300 to −350 volts. The pulse generator 29 associated with the accelerator 13 causes the voltage on the accelerator to swing between −400 and 0 volts in pulse position whereas in normal position the voltage would be somewhere between −300 to −400 volts. The pulse generator 31 associated with the sawtooth generator or target control 25, which is in turn associated with the screen 3, causes a +10 to −10 volt sawtooth to be put on the screen 3 in pulse position, and in addition, it is possible to put a negative 10 volt pulse on the screen. In normal position a voltage approximately 10 volts positive with respect to the target element is applied to screen 3. In the operation of the device no voltage pulses are applied to the target element 2 once the desired voltage is applied through adjustment of the target control. A further function of the sawtooth applied to the target's screen 3 is to suppress transients in the return beam current which result from changes in target potential during the charge and discharge cycle. The pulse generator associated with the focusing coil on pulse position supplies a voltage which swings between 55 and 285 volts and in normal position applies 170 volts.

Pulsing is at the rate of 21 pulses per frame period, i.e., 630 pulses per second and in that the pulse generators are triggered by the output wave from the synchronization circuit, for example, if the pulse generator 27, pulse generators 28, 29, and 31 are in pulse position, this would mean that the glow modulator tubes 21, cathode 1, accelerator 13, and screen 3 would have a voltage applied thereto which varies at the rate of 630 times per second.

In one operation of the disclosed device the pulses or pulse voltages are applied to the photocathode 1, accelerator13, and target screen 3, plus the array of modulator tubes 21. That is, the pulse generators 27, 28, 29 and 31 are in pulse position while the pulse generators 26 and 30 are in normal position. At this time and with this set of conditions prevailing the voltage on the photocathode approximately +10 volts, the voltage on the accelerator is approximately +25 volts and the voltage on the screen 3 is approximately —to volts and at the instant these voltages prevail, i.e., once every 1/630 of a second, the glow modulator tubes 21. At the same time, the image orthicon of the camera 15 is focused on a point source which is set against a high luminance background, giving a white-spot-on-white condition. Under normal conditions one would expect saturation and no detection of the point source. However, with the pulse condition existing when the glow modulator tubes are activated by the voltage pulse the photocathode is flooded with light, thereby emitting a cloud of electrons and due to the 15 volt difference of potential between the photocathode and the accelerator and the negative voltage on the screen 3 with respect to the target 2 the electron cloud emitted by the photocathode due to the illumination thereof by the glow tubes will pass through the interstices of the screen and maintain the target in an unsaturated condition. This is due to the high rate of pulsation and the fact that the screen and accelerator potentials are varied between normal and pulse voltage, thereby not allowing the potential of the target to become completely neutral. In addition, due to the aberrant effect produced when the secondary electrons are returned to the target corresponding to the point source, all that happens is that the background luminance is effectively removed from the target while leaving the point source. In a test utilizing the modification as indicated above, two 35 millimeter projectors were used to furnish suitable optical targets for the experiment. One projector was used to supply uniform background, while the other projected a small rectangle. The two projectors were adjusted to give equal luminance on a projection screen so that the rectangle had a contrast of plus 1. By placing neutral density filters in front of the rectangle projector, the contrast could be reduced to any desired value. When the pulsating voltages are applied to the above elements the cloud of electrons released by the photocathode reaches the target and tends to restore the target to a zero condition, however, in that the voltage is pulsating between that which would produce saturation in normal operation, and the erasure voltage, the net effect is that the background illumination is nullified on the target element and the object image is sharply delineated with respect thereto. Therefore, in that the background can be and has been suppressed, the signal takes on an amplitude of perhaps twenty times the value of the peak-to-peak to noise amplitude normally prevailing in that the signal-to-noise ratio is a function of background luminance. This can be seen by referring back to the aforementioned equation wherein it is noted that for a fixed value for lens area, the signal-to-noise ratio would increase as the square root of increasing background luminance.

In the above mode of operation it was discovered during testing that the pulsing of the screen was not absolutely necessary in order to erase the background luminance but rather that pulsing the voltage on the screen merely enhances the effect.

If, however, it is desired to detect an object image larger than a point source, it is necessary to prevent the erasing of the larger area on the target corresponding to the object image. This is accomplished by having the pulse generators 27, 28, 29 and 30 in pulse position so that a pulsating voltage is applied to the glow modulator tubes, cathode, accelerator and focus coil. In this mode of operation the voltage on the focus coil in pulse position is adjusted so as to keep the electron image in sharp focus so that the area on the target corresponding to the larger object image is not erased. The electron image is kept in focus by decreasing the voltage on the focus coil to approximately one-half that used for normal operation or increasing the voltage to approximately twice that used for normal operation. It must be understood that the voltages set forth are only applicable to the image orthicon used in testing the instant invention and that, therefore, these voltages are only approximate in the sense that the voltages depend on the age of the tube and may even vary in tubes of the same age and in addition may vary due to difference in manufacturers. However, when the voltage on the focus coil is pulsed in synchronism with the erasure voltages on the glow tubes, cathodes, and accelerator in such a fashion as to maintain the electron image in sharp focus the phenomena existing to retain the point source also apply. That is, the area corresponding to the larger object image on the target is more deficient in electrons than the surrounding background and due to the electron cloud produced by the pulsing of the glow tubes being uniform, and the high rate of pulsation, the background is erased without erasing the area corresponding to the sharply focused object image.

In another operation of the equipment the photocathode voltage is alternately switched from a value appropriate to normal operation to a value which produces secondary ratios less than unity, i.e., wherein more electrons are restored to the target element 2 than are lost therefrom due to secondary emission and at the same time focusing and defocusing the objective lens. This would cause the target voltage to alternately rise and fall with respect to the screen element 3, however, this is merely a result of causing the cathode voltage to pulsate and is not a result of pulsing the target voltage. In this operation of the equipment, the pulse generators are set so that the pulse generators 26 and 28 are in pulse position. The pulse generators 27, 29, 30 and 31 are in normal condition, therefore, the photocathode voltage alternates between approximately −400, the normal voltage, and a +10 volts while at the same time, due to synchronization, the defocusing and focusing device 22 alternately focuses and defocuses objective lens 16 in synchronism with the pulsating voltage on the photocathode. This means that when the voltage on the cathode is at plus 10 volts the objective lens is defocused. If the objective lens 16 were not defocused as the photocathode were pulsed the net result at the target would be an exact image cancellation which would have no merit. However, due to the fact the field of view being imaged on the photocathode is not uniform, i.e., there is a point source on the field of uniform or near uniform luminance the defocusing of the objective lens 16 smears the image flux over a large area of photocathode so that the erasure does not result in a cancellation of the point source, but instead accomplishes a net erasure of the background on the target element 2 with respect to the point source image.

This same effect can be accomplished by defocusing the electron image rather than the optical image. Under this set of conditions, the pulsating voltage would be applied to the photocathode and the focus coil through pulse generators 28 and 30, and when the plus 10 volts is aplied to the photocathode the focus coil 5 would be defocused thereby smearing the electron image over a large area of the target, thereby wiping out the background luminance and enhancing the point source with respect to the background.

The benefit of the subtraction method accomplished through optical or electron defocusing arises due to the fact that in certain instances there are gradations of luminance in the scene being viewed, for example, in a situation where an object image were being observed against a cloud background. This would give rise to a condition where the background has gradations of luminosity and if the photocathode were flooded with a uniform light to give a uniform subtraction of the background, gradations of the background would still show up. However, by using the image subtraction, the gradations are maintained and the gradations will subtract, thereby removing any gradation of the background and leaving the desired image on the target.

Another modification of the apparatus involves applying the pulsating voltage only to the screen 3 while the other pulse generators are in normal operation. Under this set of conditions, assume the image orthicon is viewing a uniform background of high luminance with an object image approaching a point source superimposed thereon. At the start of the frame period the target 3 will immediately begin to rise toward screen potential. However, before the target reaches saturation point the potential of the screen is changed to a value equal to or less than target potential and the secondary electrons emitted by the target are returned to the target thereby causing the potential of the target to become increasingly less positive. Due to the aberrant quality of the secondary emission image such a switching operation does not eliminate the object image while eliminating the saturation conditions. As stated previously, this is due to the fact that the flux from this object image will result in a potential increase at a point on the target, and when the potential of the screen is switched from normal to a potential equal to or less than the target potential, the secondary electrons emitted from this point and attracted to the screen will be spread over a larger area on their return to the target and, therefore, the potential of the point on the target will not be returned to zero. However, if no point image is being observed when viewing a uniform background or extended images, i.e., a very large image, the target potential will return towards zero at the end of the frame.

In this mode of operation it was discovered that if the screen were pulsed at the high rate of 630 times a second the erasure would not be as satisfactory as the erasure accomplished by pulsing the screen at a lower rate. This is due to the fact that the scene luminance is being utilized to produce the erasure electrons and will not be as high as if the glow tubes are used. The lower rate of pulsing will depend on the scene luminance in that the amount of secondary electrons used in the erasing process depends on the scene luminance and this will vary as different light levels are viewed.

Further, it is apparent that the apparatus is not limited to the detection of optical images but that with appropriate cathode coatings infra-red, ultra-violet and other types of radiant energy could be detected as well. If desired, the image orthicon could be used without a different cathode coating by merely utilizing an image converter, which is well known, to convert infra-red and ultra-violet images to photo-images.

Further, in some instances, it may be desirable to regulate the glow modulator tubes and control the amount of light flux emitted therefrom that is allowed to fall on the cathode in accordance with the average luminance of the observed scene. This could be easily accomplished by incorporating a photocell to measure the background luminance and coupling the photocell to the modulator glow tubes so that the output of the glow is regulated in accordance with the photocell reading. One way of accomplishing this would be to split the optical image coming through the objective lens via a prism and allow one image to fall on the cathode and the other image to be directed toward a photocell.

Thus, such a system can be used to discriminate against large images in favor of small images in addition to preventing saturation. However, larger images may also be observed while preventing saturation as is pointed out. In addition through the use of the invention, a 20 to 1 improvement in signal-to-noise ratio is possible which would mean that any target just detectable with conventional image orthicon television systems, would be detectable with a modified system even after undergoing a 20 to 1 reduction in contrast. Therefore, without saturation the image orthicon with a one inch diameter lens is equivalent to a single multiplier phototube with a 500 inch diameter lens. It can also be seen that such modified operation of image orthicon improves the capability for detection under high light level conditions and would be of extreme value for detection of low contrast objects at high light levels. Typical application of such a system would include space surveillance, astronomical application, air-to-air detection, and ground-to-ground detection of low contrast objects, for example, haze penetration.

Various modifications are contemplated and may be resorted to by those skilled in the art without departing from the spirit and scope of the invention, as hereinafter defined by the appended claims.

What is claimed is:

1. A storage tube comprising; cathode means adapted to emit electrons upon radiant energy impinging thereon; accelerating means for accelerating said electrons; target means disposed in the path of said emitted electrons for producing secondary electrons upon impingement of primary electrons thereon; screen means; means for applying a voltage potential to said cathode means accelerating means and screen means so that secondary electrons are attracted to said screen means; pulsing means for varying the potential on said cathode means so that electrons are restored to said target means; electron focusing means for focusing and defocusing the electrons emitted by said cathode means, said means for focusing and defocusing said electrons so constructed and arranged that said electrons are defocused in synchronism with said varying potential on said cathode means.

2. A storage tube comprising cathode means adapted to emit electrons upon radiant energy impinging thereon; accelerating means for accelerating said electrons; target means disposed in the path of said emitted electrons for producing secondary electrons upon impingement of primary electrons thereon; screen means; means for applying a voltage potential to said cathode means accelerating means and screen means so that secondary electrons are attracted to said screen means; pulsing means for varying the potential applied to said cathode means; optical means for focusing an image on said cathode means; and means for defocusing and focusing said optical means so that the optical image on said cathode means is defocused and focused in synchronism with the varying potential on said cathode means.

References Cited by the Examiner

UNITED STATES PATENTS

| | | | |
|---|---|---|---|
| 2,611,820 | 9/1952 | Somers | 315—11 |
| 2,765,422 | 10/1956 | Henderson | 313—67 X |
| 2,805,359 | 9/1957 | Theile | 315—11 |
| 2,853,648 | 9/1958 | Theile | 315—11 |
| 2,869,025 | 1/1959 | Hergenrother | 315—11 |
| 2,969,477 | 1/1961 | Gebel | 315—11 |

DAVID G. REDINBAUGH, *Primary Examiner.*

MAYNARD R. WILBUR, CHESTER L. JUSTUS, *Examiners.*